US012459300B2

(12) United States Patent
Boisdon et al.

(10) Patent No.: US 12,459,300 B2
(45) Date of Patent: Nov. 4, 2025

(54) TIRE COMPRISING A TREAD (71) Applicant: COMPAGNIE GENERALE DES ETABLISSEMENTS MICHELIN, Clermont-Ferrand (FR)

(72) Inventors: Bertand Boisdon, Clermont-Ferrand (FR); Jerome Labrousse, Clermont-Ferrand (FR); Marie-Hélène Vantal, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 200 days.

(21) Appl. No.: 17/774,564

(22) PCT Filed: Nov. 6, 2020

(86) PCT No.: PCT/FR2020/052020
§ 371 (c)(1),
(2) Date: May 5, 2022

(87) PCT Pub. No.: WO2021/089960
PCT Pub. Date: May 14, 2021

(65) Prior Publication Data
US 2022/0402307 A1 Dec. 22, 2022

(30) Foreign Application Priority Data
Nov. 6, 2019 (FR) ..................... 1912450

(51) Int. Cl.
*B60C 11/03* (2006.01)
*B60C 11/13* (2006.01)
(52) U.S. Cl.
CPC ...... *B60C 11/0302* (2013.01); *B60C 11/1392* (2013.01); *B60C 2011/0313* (2013.01)

(58) Field of Classification Search
CPC ............ B60C 11/0302; B60C 11/1392; B60C 2011/0313; B60C 11/1315
See application file for complete search history.

(56) References Cited

U.S. PATENT DOCUMENTS

2014/0251519 A1 9/2014 Piffard et al.
2016/0193882 A1* 7/2016 Mancinelli .......... B60C 11/1307
152/209.12
(Continued)

FOREIGN PATENT DOCUMENTS

CN 103826870 5/2014
EP 2 311 661 4/2011
(Continued)

OTHER PUBLICATIONS

Rittweger, English Machine Translation of EP 3009276, 2016 (Year: 2016).*

Primary Examiner — Blaine Copenheaver
Assistant Examiner — Brendon Charles Darby
(74) Attorney, Agent, or Firm — COZEN O'CONNOR (57) ABSTRACT Tire with a tread provided with two edges (25A, 25B) and with a centre (C) dividing it into two parts of equal width with sets of blocks (21A, 21B). Each set of blocks (21A, 21B) has three zones: at the edge (211), at the centre (213) and intermediate (212). Each set of blocks (21A, 21B) has a set of chamfers (26A, 26B, 26C) which extends over at least the edge zone (211) and the central zone (213) of the set of blocks (21A, 21B). The width LC2 of the set of chamfers (26A, 26B, 26C) over the intermediate zone (212) is different from the width LC3 of the set of chamfers (26A, 26B, 26C) over the central zone (213), said widths LC2 and LC3 being comprised between 0.5 mm and 2.5 mm.

12 Claims, 4 Drawing Sheets (56) References Cited

U.S. PATENT DOCUMENTS

2018/0065416 A1\* 3/2018 Mosnier .................. B60C 11/11
2018/0272810 A1   9/2018 Fabing et al.

FOREIGN PATENT DOCUMENTS

| EP | 3009276 A1 \* | 4/2016 | ......... B60C 11/0302 |
| EP | 3 261 857 | 1/2018 | |
| EP | 3 377 340 | 9/2018 | |
| WO | WO2016/134988 | 2/2015 | |
| WO | WO2019/123277 | 6/2019 | |

\* cited by examiner

TIRE COMPRISING A TREAD

RELATED APPLICATIONS

This is a U.S. National Phase Application under 35 USC 371 of International Application PCT/FR2020/052020 filed on Nov. 6, 2020.

This application claims the priority of French application no. FR 1912450 filed Nov. 6, 2019, the entire content of all of which is hereby incorporated by reference.

FIELD OF THE INVENTION

The present invention relates to a tire for a motor vehicle known as an "all-season" tire. The invention is more particularly suited to a tire intended to be fitted to a passenger vehicle or van.

BACKGROUND OF THE INVENTION

As is known, a tire known as an "all-season" tire is a tire which offers an excellent compromise between grip on snowy ground/wet ground while still maintaining good performance on dry ground. These tires are intended to run safely all year round, whatever the weather. They have generally attained the 3PMSF (3 Peak Mountain Snow Flake) winter certification attesting to their excellent performance on snowy ground and on wet ground. This certification is notably indicated on one or both of the sidewalls of this type of tire.

Document WO2016/134988 discloses an all-season tire having a tread comprising two edges and a centre. Said tread is directional and comprises a plurality of sets of blocks of rubbery material. Each set of blocks comprises a single block which extends from one edge of the tread to the centre of said tread. More particularly, the block has a central zone extending overall over an angle β1, said angle β1 being at least greater than 35 degrees and at most less than 65 degrees to an axial direction. The block also has an edge zone extending overall over an angle β3 at least greater than 0 degrees and at most less than 10 degrees to said axial direction. Finally, the block has an intermediate zone between the central zone and the edge zone of the block, said intermediate zone making an angle β2 with said axial direction.

Document WO2019/123277 discloses an all-season tire comprising a plurality of sets of blocks. Each set of blocks here comprises three blocks separated by oblique grooves and forming an edge block, a central block and an intermediate block between the edge block and the central block. Only the edge block here comprises a chamfer positioned on a leading-edge face of this edge block.

There is an ever-present need to improve the performance of all-season tires both with regard to the compromise between grip on snowy ground and grip on wet ground and with regard to grip on dry ground.

SUMMARY OF THE INVENTION

The present invention seeks to at least partially meet this need.

More specifically, the present invention seeks to improve the compromise between grip on snowy ground/wet ground for an all-season tire while at the same time improving the performance in terms of grip on dry ground.

The invention relates to a tire comprising a tread.

A "tire" means all types of tire casing made of a rubbery material and which, during running is subjected to an internal pressure or not subjected to such an internal pressure during running (which is the case of an airless tire casing without compressed air, for example of the Tweel™ type).

More particularly, the invention relates to a tire comprising a directional tread of width W.

The tread comprises two edges and a centre C. The edges delimit boundaries between this tread and two sidewalls. The centre C divides the tread into two parts of substantially equal width. The tread, on one of its two parts, comprises a plurality of sets of blocks succeeding one another in a circumferential direction.

What is meant by a "circumferential direction" is a direction that is tangential to any circle centred on the axis of rotation. This direction is perpendicular both to an axial direction and to a radial direction.

What is meant by an "axial direction" is a direction parallel to the axis of rotation of the tire.

What is meant by a "radial direction" is a direction which is perpendicular to the axis of rotation of the tire (this direction corresponds to the direction of the thickness of the tread at the centre of said tread).

Each set of blocks comprises at least one block. What is meant by a "block" is a raised element delimited by grooves and comprising lateral walls and a contact face, the latter being intended to come into contact with the ground during running. In instances in which the set of blocks comprises just one single block, said set of blocks and said block are merged.

What is meant by a "groove" is a void for which the distance between the walls of material that delimit said groove is greater than 2 mm and of which the depth is greater than or equal to 1 mm.

What is meant by a "sipe" is a void for which the distance between the walls of material that delimit said sipe is less than or equal to 2 mm and of which the depth is greater than or equal to 1 mm.

Each set of blocks extends from one of the edges of the tread towards the centre of said tread with a certain non-zero curvature. The block sets curved in this way define the directional nature of the tread.

Each set of blocks comprises an edge zone near an edge of the tread, a central zone near the centre of said tread and an intermediate zone between the central zone and the edge zone. Each set of blocks comprises a set of chamfers comprising at least one chamfer, said set of chamfers extending at least over the edge zone and the central zone of the set of blocks.

What is meant by a "set of chamfers" is a set comprising one or more chamfers, the chamfer(s) extending over the one same lateral face of the set of blocks. If the set of blocks comprises just one single block, the set of chamfers then comprises one single chamfer extending over a lateral face of the block. If the set of blocks comprises several blocks, the set of chamfers comprises at least two chamfers extending over two lateral faces of two blocks. These lateral faces belong to the same lateral face of the set of blocks, which is to say that they are situated on the same side of the set of blocks.

What is meant by a "chamfer" is an inclined wall which extends from the tread surface of the tread towards the bottom of the groove delimiting the wall. The inclination of the wall is such that the block widens towards the bottom of this groove. Each chamfer has a chamfer height and a chamfer width. The chamfer height corresponds to the distance between the tread surface of the tread and the radially innermost point of the chamfer in the groove. This distance is measured in the radial direction. The chamfer width corresponds to the distance between the radially outermost point of the chamfer and the radially innermost point of this chamfer in the groove, projected onto the tread surface of the tread. This distance is measured in the circumferential direction.

What is meant by a "tread surface" of a tread is the surface that groups together all the points of the tire that will come into contact with the ground under normal running conditions. These points that will come into contact with the ground belong to the contact faces of the blocks. For a tire, the "normal running conditions" are the use conditions defined by the ETRTO (European Tire and Rim Technical Organisation) standard. These use conditions specify the reference inflation pressure corresponding to the load-bearing capacity of the tire as indicated by its load index and its speed rating. These use conditions can also be referred to as "nominal conditions" or "working conditions".

The width of the set of chamfers over the intermediate zone is different from the width of the set of chamfers over the central zone, said widths being comprised between 0.5 mm and 2.5 mm.

The chamfer locally improves the stiffness of the set of blocks making it possible to improve the grip of this tire on dry ground. This grip is particularly improved on the edge zone of the set of blocks which extends chiefly in the axial direction. The edge zone, the intermediate zone and the central zone of the set of blocks extend in different directions. Furthermore, these zones may have different widths. By increasing those zones of the set of blocks that enjoy the benefit of a chamfer and by adapting the width of this chamfer according to the local width of the set of blocks and/or according to the direction in which this set of blocks locally extends, the grip of the tire on dry ground is optimized.

As a preference, the width of the set of chamfers over the intermediate zone is greater than the width of the set of chamfers over the central zone.

As a preference, the difference in width of the set of chamfers between the intermediate zone and the central zone is at least 0.3 mm.

As a preference, the set of chamfers extends in the edge zone of the set of blocks with a predetermined width.

As a preference, the width of the set of chamfers in the intermediate zone is greater than the width of the set of chamfers in the edge zone and than the width of the set of chamfers in the central zone.

As a preference, the set of blocks comprises a leading-edge face and a trailing-edge face, and said set of chamfers extends at the leading-edge face of said set of blocks.

What is meant by the "leading-edge face" of the set of blocks is the face of said set of blocks that is first to enter the contact patch, in the preferred direction of running of the tire. The leading-edge face of the set of blocks extends only on the one same side of the set of blocks. Thus, if the set of blocks comprises just one block, the leading-edge face of the set of blocks extends over a lateral wall of this block. If the set of blocks comprises several blocks, the leading-edge face of the set of blocks extends over several lateral walls of different blocks.

What is meant by the "trailing-edge face" of the set of blocks is the face of said set of blocks that is last to leave the contact patch, in the preferred direction of running of the tire. The trailing-edge face of the set of blocks extends only on the one same side of the set of blocks. Thus, if the set of blocks comprises just one block, the trailing-edge face of the set of blocks extends over a lateral wall of this block. If the set of blocks comprises several blocks, the trailing-edge face of the set of blocks extends over several lateral walls of different blocks.

As a preference, the set of blocks comprises another set of chamfers extending at the trailing-edge face of said set of blocks.

As a preference, the set of blocks comprises a sipe extending along the length of the set of blocks, said sipe being at least partially chamfered.

In another embodiment of the invention, the set of blocks comprises at least three blocks, a first block referred to as an edge block near the edge of the tread, a second block referred to as a central block near the central zone, and a third block referred to as an intermediate block positioned between the edge block and the central block, and wherein the set of blocks comprises a set of chamfers comprising at least three chamfers, a first chamfer referred to as an edge chamfer of width, extending in the edge block, a second chamfer referred to as a central chamfer, extending in the central block, a third chamfer referred to as an intermediate chamfer, extending in the intermediate block. The width of the edge chamfer is different from the width of the intermediate chamfer, and the width of the central chamfer is different from the width of the intermediate chamfer, said widths being comprised between 0.5 mm and 2.5 mm. The width of the set of chamfers in the intermediate zone is greater than the width of the set of chamfers in the edge zone and also greater than the width of the set of chamfers in the central zone.

The composition of the rubbery material of the blocks has a glass transition temperature Tg comprised between $-40°$ C. and $-10°$ C. and preferably between $-35°$ C. and $-15°$ C. and a complex dynamic shear modulus G* measured at 60° C. comprised between 0.5 MPa and 2 MPa, and preferably between 0.7 MPa and 1.5 MPa.

A conventional physical characteristic of an elastomeric compound is its glass transition temperature Tg, the temperature at which the elastomeric compound passes from a deformable rubbery state to a rigid glassy state. The glass transition temperature Tg of an elastomeric compound is generally determined during the measurement of the dynamic properties of the elastomeric compound, on a viscosity analyser (Metravib VA4000), according to the standard ASTM D 5992-96. The dynamic properties are measured on a sample of vulcanized elastomeric compound, that is to say elastomeric compound that has been cured to a degree of conversion of at least 90%, the sample having the form of a cylindrical test specimen having a thickness equal to 2 mm and a cross-sectional area equal to 78.5 $mm^2$. The response of the sample of elastomeric compound to a simple alternating sinusoidal shear stress, having a peak-to-peak amplitude equal to 0.7 MPa and a frequency equal to 10 Hz, is recorded. A temperature sweep is carried out at a constant rate of rise in temperature of $+1.5°$ C./min. The results utilized are generally the complex dynamic shear modulus G*, comprising an elastic part G' and a viscous part G", and the dynamic loss tgδ, equal to the ratio G"/G'. The glass transition temperature Tg is the temperature at which the dynamic loss tgδ reaches a maximum during the temperature sweep. The value of G* measured at 60° C. is indicative of the stiffness of the rubbery material, namely of its resistance to elastic deformation.

This composition of the rubbery material makes it possible to improve performance in terms of grip on snowy/wet ground. Because this material is less stiff overall, the set of chamfers on the set of blocks makes it possible to locally stiffen the stiffness of the set of blocks and this notably improves the performance in terms of grip on dry ground. The balance of performance between snowy/wet ground and dry ground is thus optimized.

The tire has a 3PMSF winter certification, said certification being indicated on a sidewall of this tire.

BRIEF DESCRIPTION OF THE DRAWINGS

The present invention will be understood better upon reading the detailed description of embodiments that are given by way of entirely non-limiting examples and are illustrated by the appended drawings, in which.

The invention is not limited to the embodiments and variants presented and other embodiments and variants will become clearly apparent to a person skilled in the art.

DETAILED DESCRIPTION OF THE INVENTION

In the various figures, identical or similar elements bear the same references.

Figure 1:
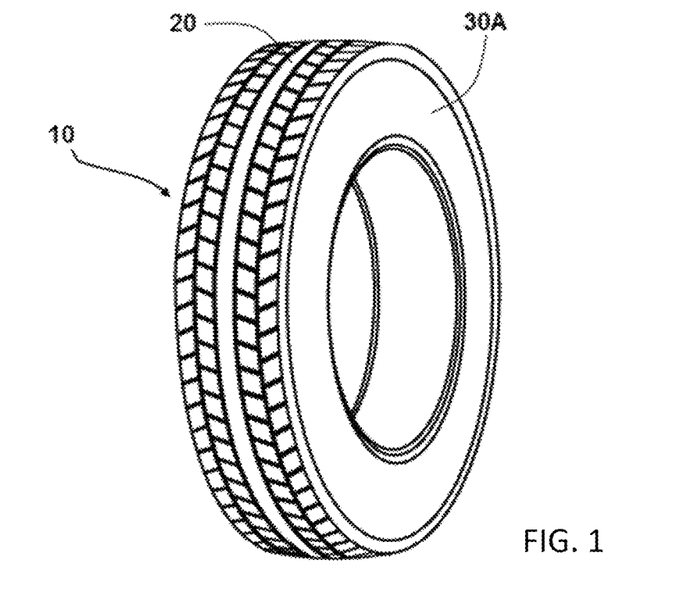
FIG. 1 is a schematic perspective view of a tire according to the prior art.
Figure 2:
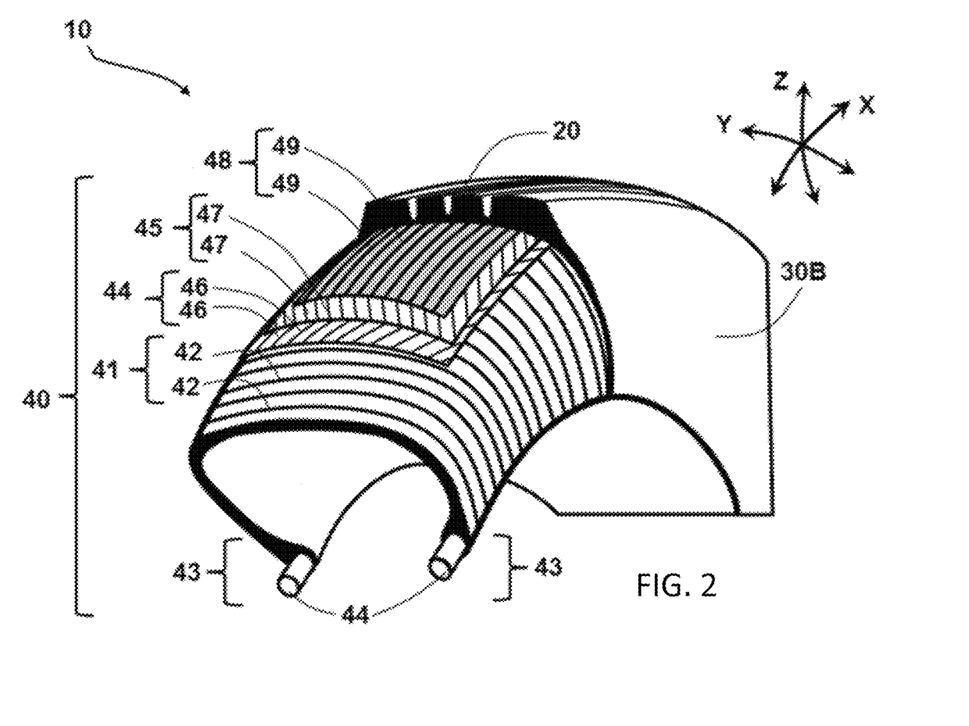
FIG. 2 is a schematic perspective view of a partial cross section of a tire according to another prior art.

FIG. 1 schematically depicts a tire 10 according to the prior art. This tire 10 comprises a tread 20 and two sidewalls 30A, 30B (of which just one is depicted here), said tread 20 and said sidewalls 30A, 30B covering a carcass 40 (which is not depicted in FIG. 1). FIG. 2 more particularly details the carcass 40 of a tire 10 according to the prior art. This carcass 40 thus comprises a carcass reinforcement 41 made up of threads 42 coated with rubber composition, and two beads 43 each comprising annular reinforcing structures 44 (in this instance bead wires) which hold the tire 10 on a rim (the rim is not depicted). The carcass reinforcement 41 is anchored in each of the beads 43. The carcass 40 additionally comprises a crown reinforcement comprising two working plies 44 and 45. Each of the working plies 44 and 45 is reinforced by filamentary reinforcing elements 46 and 47 which are parallel within each layer and crossed from one layer to the other, making angles comprised between 10° and 70° with the circumferential direction X.

The tire further comprises a hoop reinforcement 48 arranged radially on the outside of the crown reinforcement. This hoop reinforcement 48 is formed of reinforcing elements 49 that are oriented circumferentially and wound in a spiral. The tire 10 depicted in FIG. 2 is a "tubeless" tire. It comprises an "inner liner" made of a rubber composition impervious to the inflation gas, covering the interior surface of the tire.

Figure 3:
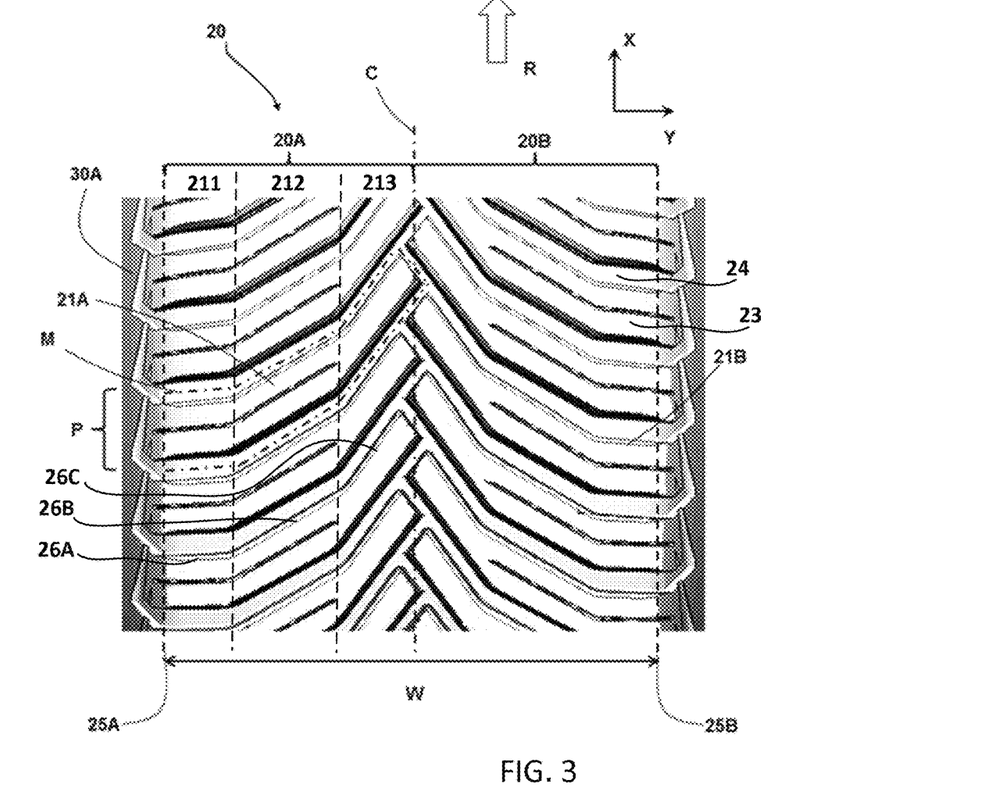
FIG. 3 is a detailed partial view of a tread, when new, of a tire according to a first mode of the invention.

FIG. 3 is a detailed partial view of a tread 20 according to the invention. The tread 20 here is as new. This tread 20 comprises two tread parts 20A, 20B of substantially equal width W/2. Each tread part 20A, 20B respectively comprises a plurality of sets of blocks 21A, 21B. The sets of blocks succeed one another in a circumferential direction. More particularly, one set of blocks belongs to a pattern M of pitch P. This pattern M is repeated n times on the circumference of the tire. This repeat may be an "iso-dimensional" repeat. The tread is then said to be monopitch. As an alternative, this repeat may occur with different magnification factors. The tread is then said to be multipitch.

Each set of blocks 21A, 21B extends respectively from one of the edges 25A, 25B of the tread 20 as far as the central axis C with a non-zero curvature. The central axis C thus comprises an alternation of blocks 21A, 21B originating respectively from the edges 25A, 25B of the tread 20. The tread 20 here is said to be directional, which means to say that the blocks 21A, 21B are specifically arranged to optimize the behavioural characteristics of the tire depending on a predetermined sense of rotation. This sense of rotation is conventionally indicated by an arrow on the sidewall of the tire (arrow labelled R in FIG. 3).

In the embodiment of FIG. 3, each set of blocks 21A, 21B comprises a single block. As an alternative, the set of blocks may comprise a number of blocks greater than or equal to 2. In each set of blocks, the blocks are then separated by at least one groove. This groove extends in an axial direction or in an oblique direction having both a non-zero component in the circumferential direction and a non-zero component in the axial direction.

It will be noted that the blocks have a maximum height at least equal to 5.5 mm and at most equal to 9 mm. As a preference, the maximum height of the blocks is at most equal to 7.5 mm. This maximum height is measured for the blocks at the central axis C. It corresponds to the distance between a tread surface 23 of the tread and a bottom surface 24. The maximum height of a block corresponds to the maximum depth of the grooves delimiting this block.

What is meant by a "tread surface" 23 of a tread 20 is the surface that groups together all the points of the tire that will come into contact with the ground under normal running conditions. These points that will come into contact with the ground belong to the contact faces of the blocks. For a tire, the "normal running conditions" are the use conditions defined by the ETRTO (European Tire and Rim Technical Organisation) standard. These use conditions specify the reference inflation pressure corresponding to the load-bearing capacity of the tire as indicated by its load index and its speed rating. These use conditions can also be referred to as "nominal conditions" or "working conditions".

What is meant by "bottom surface" 24 is a theoretical surface passing through the radially interior points of the grooves of the tread 20. It thus delimits the boundary between the tread 20 and the carcass 40 of the tire. This bottom surface 24 extends between a first edge 25A and a second edge 25B of the tread 20.

Remember that what is meant by an "edge" 25A, 25B of the tread 20 is the respective boundaries between the tread 20 and the sidewalls 30A, 30B. These two edges 25A, 25B are distant from one another by the value W corresponding to the width of the tread 20. These two edges 25A, 25B are situated at equal distances from the central axis C.

It will also be noted that a winter certification 3PMSF is marked on at least one of the sidewalls 30A, 30B of the tire.

Figure 4:
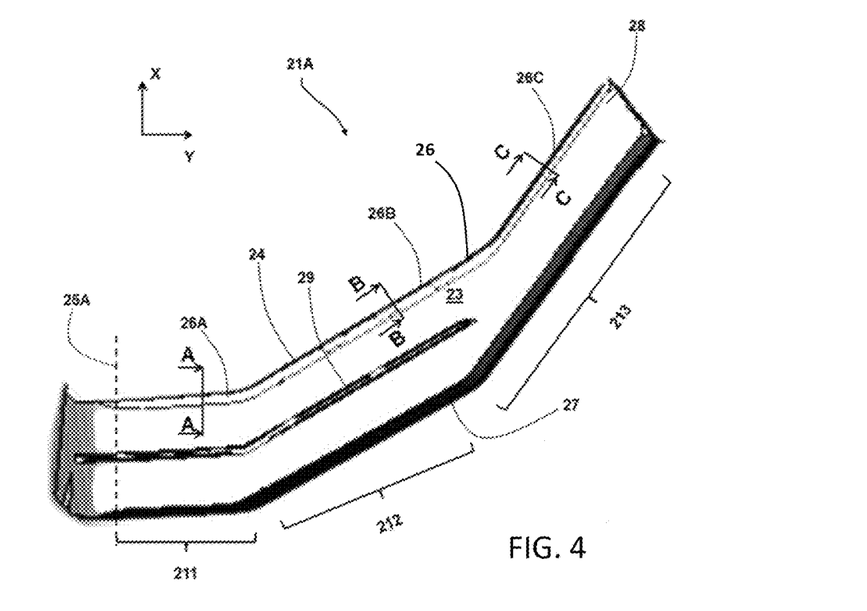
FIG. 4 is an enlarged view of a set of blocks of the tread of FIG. 3.

FIG. 4 is an enlarged view of the set of blocks 21A of FIG. 3. This set of blocks 21A is delimited by a contact surface 23, a bottom surface 24 and lateral faces 26, 27, 28. Among these lateral faces, a distinction is made between a leading-edge face 26, a trailing-edge face 27 and a central face 28. The contact surface 23, the bottom surface 24, the leading-edge face 26, the trailing-edge face 27, the central face 28 and the edge 25A delimit the total volume VT of rubbery material contained in the set of blocks 21A.

One method for determining the total volume VT of rubbery material contained in the set of blocks 21A would be to make full use of the capabilities of 3-D scanners able to directly digitize the volume of a complex object. An example of such a scanner is, for example, the WOLF & BECK TMM-570 metrology machine that employs a laser probe.

The set of blocks 21A here is divided chiefly into three zones, comprising an edge zone 211, an intermediate zone 212 extending the edge part 211, a central zone 213 extending the intermediate zone 212. Each of the zones of the set of blocks 21A here has a main direction of extension specific to it. Thus, the edge zone 211 mainly extends overall parallel to the axial direction Y. The central zone 213 is steeply inclined with respect to the axial direction Y and the intermediate zone 212 has an inclination that is comprised between the inclination of the edge zone 211 and the inclination of the central zone 213. The set of blocks 21A therefore exhibits a non-zero overall curvature.

Each set of blocks 21A comprises a set of chamfers 26A, 26B, 26C. This set of chamfers here comprises an edge chamfer 26A extending over the edge zone 211, an intermediate chamfer 26B extending over the intermediate zone 212, and a central chamfer 26C extending over the central zone 213. The edge chamfer 26A, the intermediate chamfer 26B and the central chamfer 26C follow-on from one another in the axial direction and extend over the leading-edge face of the set of blocks. The edge chamfer 26A, the intermediate chamfer 26B and the central chamfer 26C have respective widths LC1, LC2, LC3. What is meant by the width of the chamfer is the mean width of this chamfer in the selected zone of the set of blocks. These widths LC1, LC2, LC3 are comprised between 0.5 mm and 2.5 mm.

Figure 5:
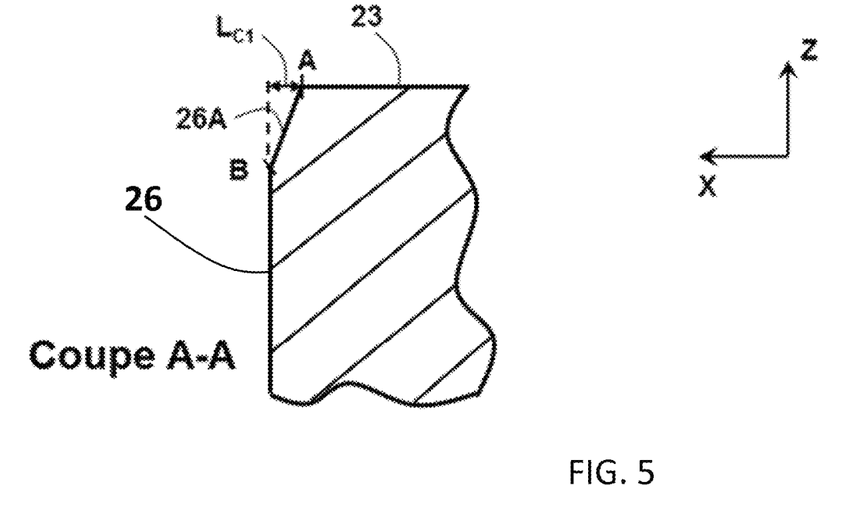
FIG. 5 is a view in cross section of the block of FIG. 4, on a plane of section A-A.

FIG. 5 illustrates a view in cross section of the set of blocks 21A of FIG. 4, on a plane of section A-A in the edge zone 211 at the edge chamfer 26A. The edge chamfer 26A forms an inclined plane which extends between a first point A and a second point B. The first point A corresponds to the intersection between the edge chamfer 26A and the tread surface 23 of the tread. The second point B corresponds to the intersection between the edge chamfer 26A and a lateral wall delimiting the edge zone 211. The edge chamfer 26A is defined by a height, a width and by an angle of inclination measured with respect to the circumferential direction X. The height of the edge chamfer 26A corresponds to the distance between the first point A and the second point B in a radial projection, which is to say in a projection onto the axis Z. The height of the edge chamfer 26A here is comprised between 0.5 and 1 mm. The width LC1 of the edge chamfer 26A corresponds to the distance between the first point A and the second point B in a circumferential projection, which is to say in a projection onto the axis X. As already indicated, the width LC1 of the edge chamfer 26A here is comprised between 1.5 and 2 mm. The angle of inclination of the edge chamfer 26A is comprised between 30 degrees and 50 degrees with respect to the circumferential direction X.

Figure 6:
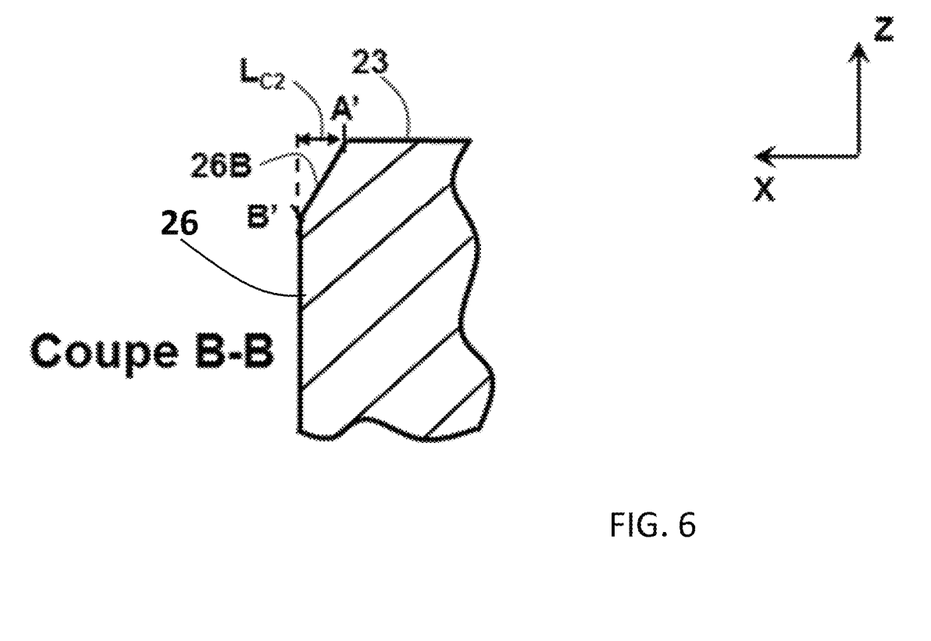
FIG. 6 is a view in cross section of the block of FIG. 4, on a plane of section B-B.

FIG. 6 illustrates a view in cross section of the set of blocks 21A of FIG. 4, on a plane of section B-B in the intermediate zone 212 at the intermediate chamfer 26B. The intermediate chamfer 26B forms an inclined plane which extends between a first point A' and a second point B'. The first point A' corresponds to the intersection between the intermediate chamfer 26B and the tread surface 23 of the tread. The second point B' corresponds to the intersection between the intermediate chamfer 26B and a lateral wall delimiting the intermediate zone 212. The intermediate chamfer 26B is defined by a height, a width and by an angle of inclination measured with respect to the circumferential direction X. The height of the intermediate chamfer 26B corresponds to the distance between the first point A' and the second point B' in a radial projection, which is to say in a projection onto the axis Z. The height of the intermediate chamfer 26B here is comprised between 0.5 and 1 mm. The width LC2 of the intermediate chamfer 26B corresponds to the distance between the first point A' and the second point B' in a circumferential projection, which is to say in a projection onto the axis X. As already indicated, the width LC2 of the intermediate chamfer 26B here is comprised between 1.5 and 2 mm. The angle of inclination of the intermediate chamfer 26B is comprised between 30 degrees and 50 degrees with respect to the circumferential direction X.

Figure 7:
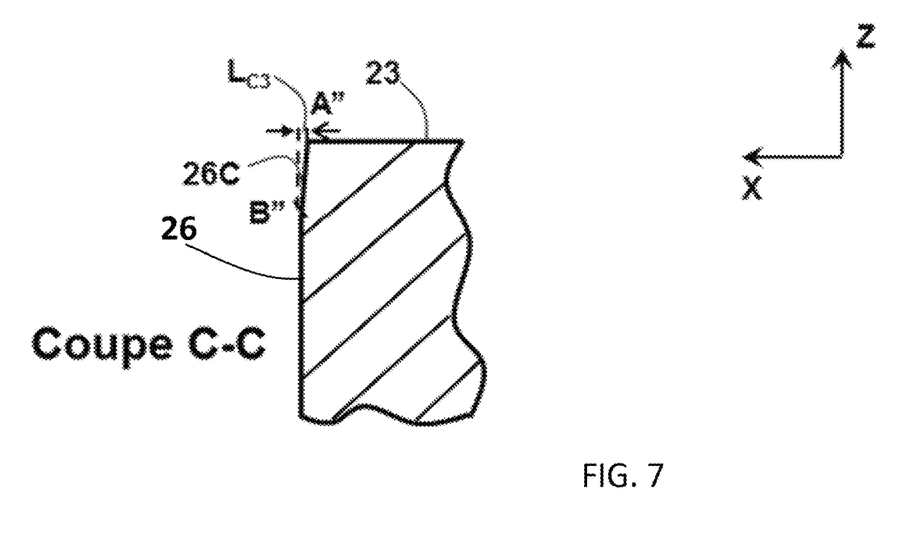
FIG. 7 is a view in cross section of the block of FIG. 4, on a plane of section C-C.

FIG. 7 illustrates a view in cross section of the set of blocks 21A of FIG. 4, on a plane of section C-C in the central zone 213 at the central chamfer 26C. The central chamfer 26C forms an inclined plane which extends between a first point A" and a second point B". The first point A" corresponds to the intersection between the central chamfer 26C and the tread surface 23 of the tread. The second point B" corresponds to the intersection between the central chamfer 26C and a lateral wall delimiting the central zone 213. The central chamfer 26C is defined by a height, a width and by an angle of inclination measured with respect to the circumferential direction X. The height of the central chamfer 26C corresponds to the distance between the first point A" and the second point B" in a radial projection, which is to say in a projection onto the axis Z. The height of the central chamfer 26C here is comprised between 0.5 and 1 mm. The width LC3 of the central chamfer 26C corresponds to the distance between the first point A" and the second point B" in a circumferential projection, which is to say in a projection onto the axis X. As already indicated, the width LC3 of the central chamfer 26C here is comprised between 1.5 and 2 mm. The angle of inclination of the central chamfer 26C is comprised between 30 degrees and 50 degrees with respect to the circumferential direction X.

As a preference, the width LC2 of the intermediate chamfer 26B over the intermediate zone 212 is different from the width LC3 of the central chamfer 26C over the central zone 213. Advantageously, the difference in width LC2-LC3 of the set of chamfers between the intermediate zone 212 and the central zone 213 is at least 0.3 mm.

In the embodiment illustrated in FIGS. 5 to 7, the width LC2 of the intermediate chamfer 26B is greater than the width LC1 of the edge chamfer 26A in the edge zone 211 and than the width LC3 of the central chamfer 26C in the central zone 213.

In FIG. 4, the edge chamfer 26A, the intermediate chamfer 26B and the central chamfer 26C extend at a leading-edge face of the set of blocks 21A. Said set of blocks 21A also comprises a trailing-edge face. Another set of chamfers extends over said trailing-edge face. As a preference, the other set of chamfers has a width that is constant over the set of blocks 21A.

In FIG. 4, the set of blocks 21A comprises a sipe 29 extending along the length of said set of blocks 21A. As a preference, the sipe 29 is at least partially chamfered.

Figure 8:
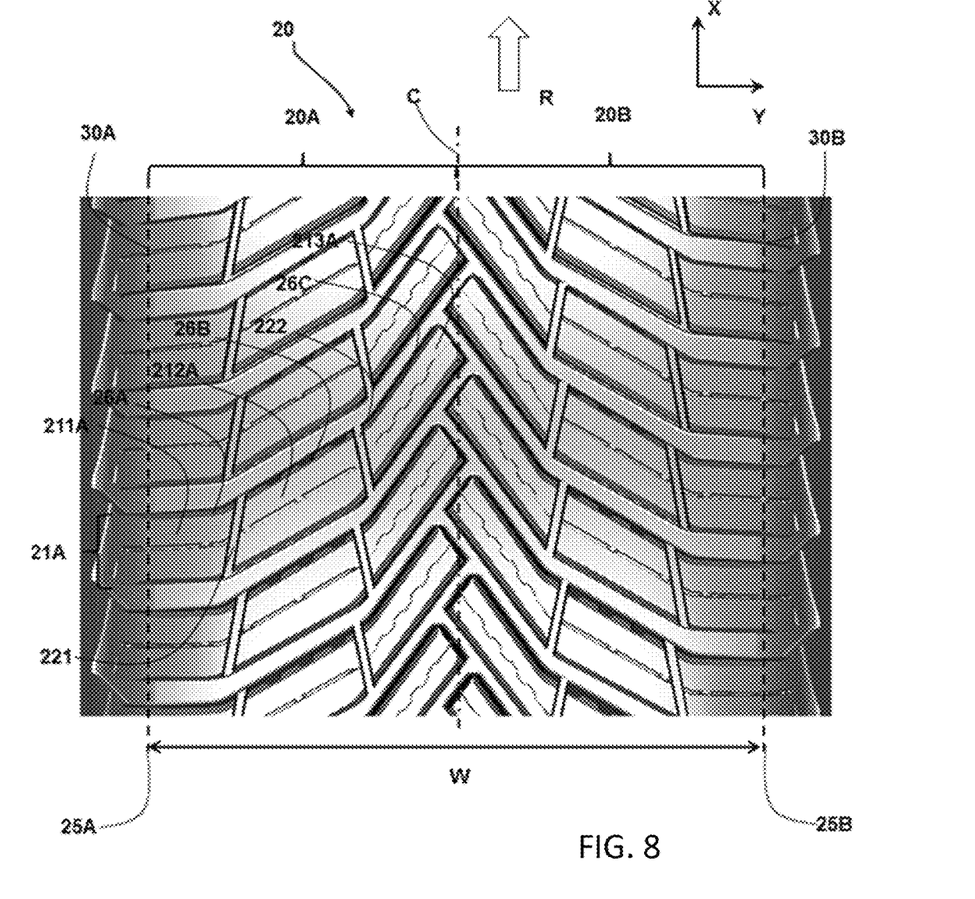
FIG. 8 is a detailed partial view of a tread, when new, of a tire according to a second embodiment of the invention.

FIG. 8 illustrates a second embodiment in which the set of blocks 21A comprises three blocks 211A, 212A, 213A. The first block 211A, referred to as an edge block, is positioned near the edge 25A of the tread. A second block 212A, referred to as an intermediate block, is positioned in the continuation of the edge block 211A. A third block 213A, referred to as a central block, is positioned in the continuation of the intermediate block 212A. The intermediate block 212A is therefore positioned between the edge block 211A and the central block 213A. The edge block 211A is separated from the intermediate block 212A by a first groove 221. The intermediate block 212A is separated from the central block 213A by a second groove 222. The first groove 221 and the second groove 222 here extend mainly in an oblique direction. This oblique direction has both a component in the circumferential direction X and a component in the axial direction Y. As an alternative, the first groove 221 and/or the second groove 222 extends (extend) only in the circumferential direction X. In addition, the edge block 211A here comprises an edge chamfer 26A of width LC1. The intermediate block 212A comprises an intermediate chamfer 26B of width LC2. The central block 213A comprises a central chamfer 26C of width LC3.

For the embodiments illustrated in FIGS. 1 to 8, each set of blocks 21A is formed from a rubbery material. In one preferred embodiment, the composition of this rubbery material has a glass transition temperature comprised between −40° C. and −10° C. and preferably between −35° C. and −15° C. and a shear modulus measured at 60° C. comprised between 0.5 MPa and 2 MPa, and preferably between 0.7 MPa and 1.5 MPa.

In one preferred embodiment, the composition of the rubbery material of the sets of blocks is based on at least:
an elastomer matrix comprising more than 50% by weight of a solution SBR bearing a silanol functional group and an amine functional group;
20 to 200 phr of at least one silica;
a coupling agent for coupling the silica to the solution SBR,
10 to 100 phr of a hydrocarbon-based resin having a Tg of greater than 20° C.;
15 to 50 phr of a liquid plasticizer.

The solution SBR in this preferred embodiment is a copolymer of butadiene and styrene, prepared in solution. The characteristic feature thereof is that it bears a silanol functional group and an amine functional group. The silanol functional group of the solution SBR bearing a silanol functional group and an amine functional group may for example be introduced by hydrosilylation of the elastomer chain by a silane bearing an alkoxysilane group, followed by hydrolysis of the alkoxysilane functional group to give a silanol functional group. The silanol functional group of the solution SBR bearing a silanol functional group and an amine functional group may equally be introduced by reaction of the living elastomer chains with a cyclic polysiloxane compound as described in EP 0 778 311. The amine functional group of the solution SBR bearing a silanol functional group and an amine functional group may for example be introduced by initiating polymerization using an initiator bearing such a functional group. A solution SBR bearing a silanol functional group and an amine functional group may equally be prepared by reacting the living elastomer chains with a compound bearing an alkoxysilane functional group and an amine functional group according to the procedure described in patent application EP 2 285 852, followed by hydrolysis of the alkoxysilane functional group to give a silanol functional group. According to this preparation procedure, the silanol functional group and the amine functional group are preferably situated within the chain of the solution SBR, not including the ends of the chain. The reaction producing the hydrolysis of the alkoxysilane functional group borne by the solution SBR to give a silanol functional group may be carried out according to the procedure described in patent application EP 2 266 819 A1 or else by a step of stripping the solution containing the solution SBR. The amine functional group can be a primary, secondary or tertiary amine functional group, preferably a tertiary amine functional group.

The invention is not limited to the embodiments and variants presented and other embodiments and variants will become clearly apparent to a person skilled in the art.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A tire comprising a directional tread, said tread comprising:
two edges and a centre (C) dividing said tread into two parts of substantially equal width,
said tread comprising, on one of the two parts of said tread, a plurality of sets of blocks,
each set of blocks comprising at least one block,
each set of blocks extending from one of the edges of the tread until the centre (C) of said tread with a non-zero curvature,
each set of blocks comprising an edge zone near an edge of the tread, a central zone at the centre of said tread, and an intermediate zone between the edge zone and the central zone,
each set of blocks comprising a set of chamfers comprising at least one chamfer, said set of chamfers extending over the edge zone, the central zone and the intermediate zone of the set of blocks,
wherein a width LC2 of the set of chamfers over the intermediate zone is different from a width LC3 of the set of chamfers over the central zone, said widths LC2 and LC3 being comprised between 0.5 mm and 2.5 mm, a width of a chamfer corresponding to a distance between the radially outermost point of the chamfer and the radially innermost point of this chamfer in a groove, projected onto a tread surface of the tread, and measured in the circumferential direction,
wherein the set of chamfers has an inclined wall extending radially inward from the tread surface of the tread to a vertical edge face, and
wherein an intermediate zone angle of inclination is between 30 degrees and 50 degrees, and a central zone angle of inclination is between 30 degrees and 50 degrees.

2. The tire according to claim 1, wherein the width LC2 of the set of chamfers over the intermediate zone is greater than the width LC3 of the set of chamfers over the central zone.

3. The tire according to claim 1, wherein the difference in width LC2-LC3 of the set of chamfers between the intermediate zone and the central zone is at least 0.3 mm.

4. The tire according to claim 1, wherein said set of chamfers extends in the edge zone of the set of blocks with a width LC1.

5. The tire according to claim 4, wherein the width LC2 of the set of chamfers in the intermediate zone is greater than the width LC1 of the set of chamfers in the edge zone and the width LC3 of the set of chamfers in the central zone.

6. The tire according to claim 1, the set of blocks comprising a leading-edge face and a trailing-edge face, wherein said set of chamfers extends at the leading-edge face of said set of blocks.

7. The tire according to claim 6, wherein the set of blocks comprises another set of chamfers extending at the trailing-edge face of said set of blocks.

8. The tire according to claim 7, wherein the another set of chamfers extending at the trailing-edge face of said set of blocks has a constant width.

9. The tire according to claim 1, wherein the set of blocks comprises a sipe extending along a length of said set of blocks, said sipe being at least partially chamfered.

10. The tire according to claim 1, wherein the set of blocks comprises at least three blocks, a first block referred to as an edge block near the edge of the tread, a third block referred to as a central block near the central zone and a second block referred to as an intermediate block positioned between the edge block and the central block and wherein the set of blocks comprises a set of chamfers comprising at least three chamfers, a first chamfer referred to as an edge chamfer of width LC1, extending in the edge block, a second chamfer referred to as an intermediate chamfer of width LC2, extending in the intermediate block, a third chamfer, referred to as a central chamfer, of width LC3, extending in the central block, the width LC1 of the edge chamfer being different from the width LC2 of the intermediate chamfer, and the width LC3 of the central chamfer being different from the width LC2 of the intermediate chamfer, said widths LC1, LC2, LC3 being comprised between 0.5 mm and 2.5 mm, and in that the width LC2 of the set of chamfers in the intermediate zone is greater than the width LC1 of the set of chamfers in the edge zone and the width LC3 of the set of chamfers in the central zone.

11. The tire according to claim 1, wherein a composition of a rubbery material of the blocks has a glass transition temperature Tg comprised between −40° C. and −10° C. and a complex dynamic shear modulus G* comprised between 0.5 MPa and 2 MPa, the measurements being taken at a temperature of 60° C. under simple alternating sinusoidal shear stress with a peak-to-peak amplitude equal to 0.7 MPa and a frequency equal to 10 Hz.

12. The tire according to claim 1, wherein said tire has a 3PMSF winter certification, said certification being indicated on a sidewall of the tire.

\* \* \* \* \*